United States Patent Office 3,401,108
Patented Sept. 10, 1968

3,401,108
PROCESS FOR THE GLOW DISCHARGE MANUFACTURE OF HYDRAZINE FROM PRE-HEATED AMMONIA
Jean P. Manion, Milwaukee, and Edward T. Losin, Mequon, Wis., assignors to Allis-Chalmers Manufacturing Company, Milwaukee, Wis.
No Drawing. Filed Dec. 20, 1965, Ser. No. 515,224
5 Claims. (Cl. 204—177)

This invention relates to the synthesis of hydrazine from ammonia in the electric discharge and more particularly to an improved method of such synthesis.

It is well known to the art that hydrazine along with elemental nitrogen and hydrogen is produced when gaseous ammonia is subjected to the action of the electrical discharge. The amount of hydrazine produced, the efficiency of production based on energy supplied to the discharge and the relative amount of ammonia converted to hydrazine compared to the by-products nitrogen and hydrogen depend on the various discharge parameters. Thus it is known in the art that improvement in the yield of hydrazine obtained per kilowatt hour of power supplied to the discharge is obtained when the ammonia is passed through the discharge region at reduced pressure and at rapid flow rates. In particular, low current densities are required in order to achieve a favorable energy yield. (The chemistry of Hydrazine, Audrieth and Ogg, J. Wiley & Sons (1959) pp. 23, 24).

However, other process parameters upon which commercial utilization depend, such as hydrazine production rate and hydrazine concentration in the products of the glow discharge have not reached practical levels, For example, the hydrazine concentrations obtained in the glow discharge processes of the prior art are so low that the cost of separation from ammonia is unadvantageous commercially. Because of the relatively low production rate of hydrazine of the prior art processes, scale up of these processes to commercial levels would result in the unwieldly and impractical number of discharge units necessary to achieve economical rates of production.

The art has demonstrated that the rate of hydrazine production by electrical discharge cannot be efficiently increased by an increase in the discharge current or by increasing the volume of the discharge. In fact, the art teaches that the converse is true, i.e., an increase in the discharge current has the effect of decreasing the production rate of hydrazine per unit of current and results in a large decrease in energy yield.

The art further teaches that the conditions under which hydrazine is formed from ammonia by electrical discharge require that the temperatures be below 350–400° C. Higher temperatures are to be avoided for a number of reasons, e.g., hydrazine decomposes, sometimes with violence, at temperatures above 350–400° C. (U.S. Patent No. 2,849,357) and no substantial increase in hydrazine yield is obtained above 350° C. (J. Am. Chem. So. 76, 2623 (1954).)

As an illustration of the production rates of hydrazine produced by the glow discharge of ammonia and resultant hydrazine concentration in the discharge products obtained in the prior art, Ouchie (J. Electrochem. Soc. Japan, 20, 166 (1952) Table 1), using an intermittant pulse discharge in the electrical discharge of ammonia achieved a production rate of $5.31 \times 10^{-8}$ moles/sec. and a hydrazine concentration in the discharge product of 0.013%.

In accordance with the present invention, the rate of hydrazine production by glow discharge as well as the concentration of hydrazine in the discharge products is substantially increased without deleterious effect on the energy yield by a process wherein gaseous ammonia is passed under reduced pressure between the electrodes of an electrical glow discharge vessel at a current of at least 40 milliamperes and a temperature of at least about 405° C.

It is a necessary and essential feature of the present invention that the ammonia gas be heated to a temperature above 400° C. before entering the region of electrical discharge and preferably at a temperature between about 440° to about 550° C. At temperatures substantially above 650° C., thermal decomposition of hydrazine occurs at a rate which negatives the gains achieved at the elevated temperature. If temperatures below 400° C. are employed, as will be illustrated hereinafter, the yield of hydrazine is substantially reduced as well as the hydrazine production rate and concentration of hydrazine in the discharge products.

It is a still further and necessary feature of the present invention that a current of at least 40 milliamperes be employed. If currents substantially less than 40 milliamperes are employed, the effect of temperature on increased hydrazine production rate and hydrazine concentration in the discharge products is substantially eliminated.

The ammonia gas in the process of the present invention is passed between the electrodes of the electrical discharge apparatus, preferably at a linear flow rate of about 3,000 to about 30,000 centimeters per second.

The electrical discharge of the ammonia is effected at reduced pressure, generally about 10 to about 100 millimeters of mercury, and preferably between about 10 to about 50 millimeters of mercury. The use of pressures substantially below 10 millimeters of mercury results in lower yields of hydrazine.

The electrical discharge apparatus may be of any convenient type and arrangement, as disclosed, for example, in U.S. Patent Nos. 2,728,723, 2,849,357, or 2,849,356. Any suitable material such as tantalum, copper, silver, iron, platinum, or the like may be used as an electrode material. It is preferred, however, that the cathode used in the electrical discharge apparatus be a low work function electrode.

A low function cathode within the meaning of the present invention is any cathode having a photoelectric work function of about 2.5 electron volts or less. For example, alkaline earth metals, alkali metals and oxides thereof such as lithium, sodium, potassium, rubidium, cesium, barium, barium oxide, zirconium oxide, cesium oxide, strontium oxide are illustrative of materials of which the surface of the low work function cathode may be comprised.

To illustrate the manner in which the process of the present invention may be carried out, the following examples are given. It is to be understood, however, that the examples are for the purpose of illustration and the invention is not to be limited to the specific conditions or materials recited therein.

Example 1

Ammonia gas was passed at a pressure of 40 millimeters of mercury through a glow discharge apparatus comprised of a tube of insulated Vycor glass equipped with means for heating, recording of temperature, and placement of electrodes. The internal diameter of the tube was 1.5 centimeters and the interelectrode distance was 2.3 centimeters. The cathode consisted of a tungsten wire 0.025 to 0.06 inch in diameter around which was coiled a spiral of tungsten wire of about 0.002 inch diameter coated with a mixture of cesium oxide and strontium oxide which had a photoelectric work function of less than 2.5 electron volts. The anode was a hollow tube of 304 stainless steel, 0.05 to 0.125 inch in diameter. Water was circulated through the hollow anode to cool and prevent both deterioration of the anode and decomposition of both ammonia and hydrazine at its surface. The ammonia gas was passed at a linear flow velocity of 9000 cm./sec. through the tube at temperatures varying from 406° C. to 547° C. Currents used for the electrical discharge were varied from 40 to 320 milliamperes.

The discharge product consisting primarily of a mixture of hydrazine, hydrogen, nitrogen and unreacted ammonia was collected in cold traps placed downstream from the discharge cell and maintained at −196° C. The production rates, concentrations of hydrazine in the discharge product and energy yield of hydrazine in grams/kilowatt hour (kwh.) of electrical energy at the various temperatures and currents used to produce the electrical discharge are summarized in Table I below.

For purposes of contrast, hydrazine was prepared following the procedure of the example with exception that the temperatures employed were outside the scope of the present invention. The yield of hydrazine produced in these control experiments as well as the production rates and concentrations of hydrazine in the discharge product are also summarized in Table I below and are designated by the symbol C.

TABLE I

| Run. No. | Temp. ° C. | Discharge current (ma.) | Discharge voltage (volts) | Rate of $N_2H_4$ Production, moles/sec. $\times 10^{-6}$ | $N_2H_4$ yield (g./KWH) | Conc. of $N_2H_4$ in discharge prod. (wt. percent) |
|---|---|---|---|---|---|---|
| 1 | 445 | 40 | 870 | 10.9 | 35.9 | 0.037 |
| 2 | 406 | 160 | 730 | 29.6 | 29.2 | 0.089 |
| 3 | 418 | 160 | 755 | 30.1 | 29.5 | 0.092 |
| 4 | 469 | 320 | 580 | 42.31 | 26.2 | 0.16 |
| 5 | 547 | 320 | 580 | 45.33 | 28.1 | 0.21 |
| $C_1$ | 320 | 40 | 1,055 | 8.35 | 22.8 | 0.021 |
| $C_2$ | 313 | 160 | 820 | 20.97 | 19.0 | 0.024 |
| $C_3$ | 273 | 320 | 605 | 29.6 | 18.2 | 0.082 |
| $C_4$ | 362 | 320 | 590 | 31.2 | 19.5 | 0.102 |

By referring to the above table, it is at once apparent that the production rate and concentration of hydrazine in the discharge product is substantially increased at temperatures above 400° C. when compared with temperatures below 400° C., without deleterious effect on the yield of hydrazine.

Example 2

The procedure of Example 1 was repeated with the exception that the interelectrode distance in the discharge cell was 1.5 centimeters. Ammonia gas heated to a temperature of 618° C. was passed at a pressure of 20 millimeters of mercury through the discharge tube at a linear flow velocity of 30,000 cm./sec. Using a discharge current of 640 milliamperes and a discharge voltage of 417 volts, the rate of hydrazine production was 59.6 moles/sec.$\times 10^{-6}$, energy yield of hydrazine was 25.7 g./kwh. and the concentration of hydrazine in the discharge product was 0.12 weight percent.

The embodiments of the invention in which an exclusive property or privilege is claimed are defined as follows:

1. A process for preparing hydrazine which comprises passing ammonia under reduced pressure, heated to a temperature of at least 405° C. between the electrodes of an electrical glow discharge vessel at a current of at least 40 milliamperes.

2. The process of claim 1 wherein the ammonia is heated to a temperature between about 440° C. to about 650° C.

3. The process of claim 1 wherein the ammonia is passed through the electrical glow discharge at a pressure of about 10 to about 100 millimeters of mercury.

4. The process of claim 1 wherein one of said electrodes is a low work function cathode having a photoelectric work function of less than 2.5 electron volts.

5. The process of claim 4 wherein the cathode has a surface comprised of cesium oxide and strontium oxide.

References Cited

UNITED STATES PATENTS

| 2,728,723 | 12/1955 | Akerloff | 204—177 |
| 2,849,356 | 8/1958 | Manion | 204—177 |
| 2,849,357 | 8/1958 | Devine et al. | 204—177 |
| 3,020,223 | 2/1962 | Manion | 264—177 |
| 3,272,730 | 9/1966 | Berghaus et al. | 204—177 |

ROBERT K. MIHALEK, *Primary Examiner.*